United States Patent
Simon et al.

(10) Patent No.: US 10,935,275 B2
(45) Date of Patent: Mar. 2, 2021

(54) HVAC SYSTEM THERMAL RECOVERY

(71) Applicant: Carrier Corporation, Farmington, CT (US)

(72) Inventors: Emile C. Simon, Cork (IE); Marcin Cychowski, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 808 days.

(21) Appl. No.: 15/165,502

(22) Filed: May 26, 2016

(65) Prior Publication Data
US 2016/0348938 A1  Dec. 1, 2016

Related U.S. Application Data

(60) Provisional application No. 62/168,098, filed on May 29, 2015.

(51) Int. Cl.
F24F 12/00 (2006.01)
F24F 11/00 (2018.01)
(Continued)

(52) U.S. Cl.
CPC ............ F24F 12/006 (2013.01); F24F 11/30 (2018.01); F24F 11/62 (2018.01); F24F 11/83 (2018.01);
(Continued)

(58) Field of Classification Search
CPC ...... F24F 12/00; F24F 12/001; F24F 2110/10; F24F 2110/12; F24F 2110/20; F24F 2110/22
See application file for complete search history.

(56) References Cited

U.S. PATENT DOCUMENTS 4,475,685 A   10/1984 Grimado et al.
RE32,722 E *  8/1988 Johnson ................ F24F 3/1411
                                                            55/475
(Continued)

FOREIGN PATENT DOCUMENTS

CN   101617176 A   12/2009
CN   102628600 A    8/2012
(Continued)

OTHER PUBLICATIONS

Chinese First Office Action for application CN 201610365579.0, dated Aug. 7, 2019, 10 pages.

*Primary Examiner* — Nelson J Nieves
*Assistant Examiner* — Meraj A Shaikh
(74) *Attorney, Agent, or Firm* — Cantor Colburn LLP

(57) ABSTRACT

An HVAC system includes an air handling unit (AHU), a heat recovery device, and a controller. The controller is configured to determine an average heating or cooling demand of one or more zones served by the AHU, determine if a heating or cooling capacity is available at the heat recovery device, where the capacity available at the heat recovery device is a heating or cooling capacity to heat or cool the air from an outdoor environment with air extracted from the one or more zones served by the AHU, determine a heat recovery command setpoint based on the determined average heating or cooling demand and the determined available heating or cooling capacity, and send a signal indicative of the determined heat recovery command setpoint to at least one of the AHU and the heat recovery device.

17 Claims, 2 Drawing Sheets

(51) Int. Cl.
  *F24F 11/30* (2018.01)
  *F24F 11/62* (2018.01)
  *F24F 11/83* (2018.01)
  *F24F 110/10* (2018.01)
  *F24F 110/12* (2018.01)
  *F24F 11/64* (2018.01)
  *F24F 11/84* (2018.01)

(52) U.S. Cl.
  CPC ............. *F24F 12/001* (2013.01); *F24F 11/64* (2018.01); *F24F 11/84* (2018.01); *F24F 2110/10* (2018.01); *F24F 2110/12* (2018.01); *Y02B 30/56* (2013.01)

(56) References Cited

U.S. PATENT DOCUMENTS

| | | | |
|---|---|---|---|
| 4,841,733 A * | 6/1989 | Dussault | F24F 5/0071 62/93 |
| 7,024,283 B2 | 4/2006 | Bicknell | |
| 7,047,751 B2 * | 5/2006 | Dinnage | F24F 3/1405 62/94 |
| 8,560,126 B2 | 10/2013 | Vass et al. | |
| 8,606,374 B2 | 12/2013 | Fadell et al. | |
| 2003/0207665 A1 | 11/2003 | Liu | |
| 2010/0262298 A1 | 10/2010 | Johnson et al. | |
| 2011/0308265 A1 * | 12/2011 | Phannavong | F24F 12/001 62/160 |
| 2013/0116951 A1 * | 5/2013 | McKie | F24F 3/1423 702/61 |
| 2013/0190940 A1 | 7/2013 | Sloop et al. | |
| 2014/0222219 A1 | 8/2014 | Wen | |
| 2014/0260965 A1 * | 9/2014 | Finkam | B01D 53/30 95/12 |
| 2014/0358291 A1 | 12/2014 | Wells | |
| 2014/0365017 A1 | 12/2014 | Hanna et al. | |
| 2015/0057811 A1 * | 2/2015 | Fan | G05B 19/052 700/276 |
| 2017/0003036 A1 * | 1/2017 | Andersson | F24F 12/003 |

FOREIGN PATENT DOCUMENTS

| | | |
|---|---|---|
| CN | 102939504 A | 2/2013 |
| CN | 103398443 A | 11/2013 |
| DE | 19831127 A1 | 3/2001 |
| EP | 1866575 B1 | 1/2011 |
| WO | 2013142105 A1 | 9/2013 |
| WO | 2015013677 A2 | 1/2015 |
| WO | 2015014229 A1 | 2/2015 |

* cited by examiner

HVAC SYSTEM THERMAL RECOVERY

CROSS-REFERENCE TO RELATED APPLICATIONS

This application claims the benefit of U.S. provisional patent application Ser. No. 62/168,098, filed May 29, 2015, the entire contents of which are incorporated herein by reference.

TECHNICAL FIELD

The subject matter disclosed herein relates to HVAC system air handling components and, more specifically, to control of thermal recovery control of components such as air handling units.

BACKGROUND

Some known air handling units (AHUs) may use a heat recovery device to recover useful heat in order to control a supply air temperature (SAT) towards a desired setpoint temperature (SATsp), which is often fixed or determined based on outside air temperature. Heat recovery control is typically modulated in response to the difference between SAT and SATsp. For example, full heat recovery may only be available for a relatively large difference. However, this may result in energy waste since valuable heat will be lost to the outside air resulting in reduced energy efficiency and thus increased operating cost. This may also result in inadequate heating of outside cold air.

Accordingly, it is desirable to provide a control system to improve AHU thermal recovery and coordination with an actual demand of the indoor environment.

BRIEF DESCRIPTION

In one aspect, a control system for an HVAC system having an mr handling unit (AHU) and a heat recovery device is provided. The control system includes a controller having a processor and a memory, the controller being in signal communication with the AHU. The controller is configured to determine an average heating or cooling demand of one or more zones served by the AHU, determine if a heating or cooling capacity is available at the heat recovery device, where the capacity available at the heat recovery device is a heating or cooling capacity to heat or cool the air from an outdoor environment with air extracted from the one or more zones served by the AHU, determine a heat recovery command setpoint based on the determined average heating or cooling demand and the determined available heating or cooling capacity, and send a signal indicative of the determined heat recovery command setpoint to at least one of the AHU and the heat recovery device.

In addition to one or more of the features described above, or as an alternative, further embodiments may include configurations where the controller is further configured to determine constraints on air quality parameters of air supplied to the HVAC system, wherein the heat recovery command setpoint is further based on the determined constraints; wherein the heat recovery device is configured to move between a fully open position and a fully closed position; wherein if the determined average heating or cooling demand is of the same type as the determined available heating or cooling capacity, the determined heat recovery command setpoint indicates the heat recovery device should be moved to the fully open position; wherein if the determined average heating or cooling demand is not of the same type as the determined available heating or cooling capacity, the determined heat recovery command setpoint indicates the heat recovery device should be moved to the fully closed position; and/or wherein the controller is further configured to move the heat recovery device to the fully open position or the fully closed position based on the determined heat recovery command setpoint.

In another aspect, an HVAC system is provided. The HVAC system includes an air handling unit (AHU), a heat recovery device operably associated with the AHU, and a controller having a processor and a memory, the controller in signal communication with at least one of the AHU and the heat recovery device. The controller is configured to determine an average heating or cooling demand of one or more zones served by the AHU, determine if a heating or cooling capacity is available at the heat recovery device, where the capacity available at the heat recovery device is a heating or cooling capacity to heat or cool the air from an outdoor environment with air extracted from the one or more zones served by the AHU, determine a heat recovery command setpoint based on the determined average heating or cooling demand and the determined available heating or cooling capacity, and send a signal indicative of the determined heat recovery command setpoint to at least one of the AHU and the heat recovery device.

In addition to one or more of the features described above, or as an alternative, further embodiments may include configurations wherein the controller is further configured to determine constraints on air quality parameters of air supplied to the HVAC system, wherein the heat recovery command setpoint is further based on the determined constraints; wherein the heat recovery device is configured to move between a fully open position and a fully closed position; wherein if the determined average heating or cooling demand is of the same type as the determined available heating or cooling capacity, the determined heat recovery command setpoint indicates the heat recovery device should be moved to the fully open position; wherein if the determined average heating or cooling demand is not of the same type as the determined available heating or cooling capacity, the determined heat recovery command setpoint indicates the heat recovery device should be moved to the fully closed position; and/or wherein the controller is further configured to move the heat recovery device to the fully open position or the fully closed position based on the determined heat recovery command setpoint.

In yet another aspect, a method of controlling an HVAC system having an air handling unit (AHU), a heat recovery device, and a controller in signal communication with at least one of the AHU and the heat recovery device is provided. The method includes determining an average heating or cooling demand of one or more zones served by the AHU, determining if a heating or cooling capacity is available at the heat recovery device, where the capacity available at the heat recovery device is a heating or cooling capacity to heat or cool the air from an outdoor environment with air extracted from the one or more zones served by the AHU, determining a heat recovery command setpoint based on the determined average heating or cooling demand and the determined available heating or cooling capacity, sending a signal indicative of the determined heat recovery command setpoint to at least one of the AHU and the heat recovery device, and subsequently operating at least one of the AHU and the heat recovery device at the determined heat recovery command setpoint.

In addition to one or more of the features described above, or as an alternative, further embodiments may include: determining constraints on air quality parameters of air supplied to the HVAC system, wherein the heat recovery command setpoint is further based on the determined constraints; wherein air quality parameters are at least one of a humidity ratio and a CO2 content of the outside air form the outdoor environment and the air extracted from the one or more zones served by the AHU; wherein the heat recovery device is configured to move between a fully open position and a fully closed position; wherein if the determined average heating or cooling demand is the same type as the determined available heating or cooling capacity, the determined heat recovery command setpoint indicates the heat recovery device should be moved to the fully open position; wherein if the determined average heating or cooling demand is not of the same type as the determined available heating or cooling capacity, the determined heat recovery command setpoint indicates the heat recovery device should be moved to the fully closed position; and/or wherein said subsequently operating at least one of the AHU and the heat recovery device at the determined heat recovery command setpoint comprises moving the heat recovery device to the fully open position or the fully closed position based on the determined heat recovery command setpoint.

BRIEF DESCRIPTION OF THE DRAWINGS

The foregoing and other features, and advantages of embodiments are apparent from the following detailed description taken in conjunction with the accompanying drawings in which.

DETAILED DESCRIPTION

Figure 1:
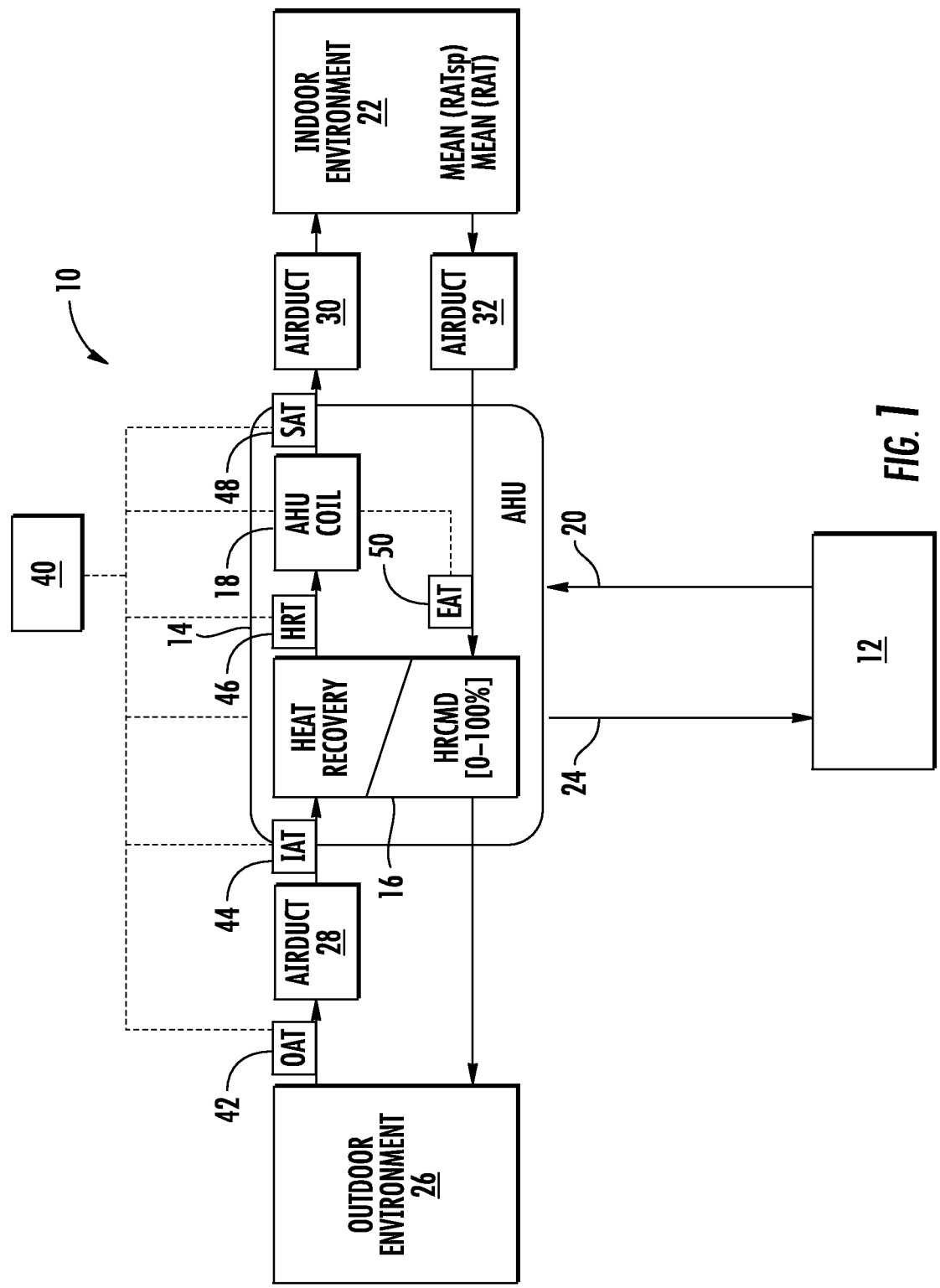
FIG. 1 is a schematic view of an exemplary HVAC system.

FIG. 1 illustrates an exemplary HVAC system 10 that generally includes a capacity generation plant 12 operatively associated with an air handling unit (AHU) 14 having a heat recovery device 16 and a heat exchanger or coil 18. Capacity generation plant 12 conditions (i.e., heats/cools) a heat transfer fluid such as water and supplies the conditioned fluid to AHU 14 (via a supply conduit 20) where the conditioned fluid is utilized to condition air forced through AHU 14. The conditioned air is then used to adjust the temperature of an indoor environment 22 (e.g., an area or zone) associated with HVAC system 10. The fluid is then returned to capacity generation plant 12 via a return conduit 24 where the fluid is re-conditioned.

AHU 14 receives air from an outdoor environment 26 via an air duct 28. The air is subsequently passed through heat recovery device 16 where it may be selectively directed in heat exchange relation with air extracted from indoor environment 22. The air is then supplied to coil 18 where it may be further conditioned (i.e., heated/cooled) by the heat transfer fluid from capacity generation plant 12. Alternatively, component 14 may not include coil 18. The conditioned air is subsequently supplied via air duct 30 to indoor environment 22. Air extracted from indoor environment 22 is supplied via air duct 32 to heat recovery device 16 where it may be used in heat exchange relation to heat or cool incoming air from outdoor environment 26. The extracted air is then exhausted to outdoor environment 26. Although component 14 is described in the exemplary embodiment as an air handling unit, component 14 may be any HVAC component having a thermal recovery device that preconditions outside air before supplying it to indoor environment 22.

Heat recovery device 16 may be a device that enables two air streams to exchange thermal energy. Heat recovery device 16 may directly mix the two air streams or may provide heat exchange indirectly (e.g., a plate heat exchanger). Heat recovery device 16 is movable from a fully closed position to a fully open position. In the fully closed position, air extracted from indoor environment 22 is not directed into heat exchange relation with incoming outside air (e.g., bypassed). In the fully open position, the entire portion of the extracted air is directed into heat exchange relation with the incoming outside air. Heat recovery device may be positioned between the fully closed position and the fully open position such that only a portion (e.g., 60%) of the extracted air is directed into heat exchange relation with the incoming outside an.

A controller 40 is in signal communication with AHU 14 and indoor environment 22 and is configured to coordinate the operation of AHU 14 and heat recovery device 16 with the actual demand of indoor environment 22. Controller 40 may be in signal communication with a first sensor 42 configured to measure outdoor air temperature (OAT), a second sensor 44 configured to measure input air temperature (IAT), a third sensor 46 configured to measure heat recovery air temperature (HRT), a fourth sensor 48 configured to measure supply air temperature (SAT), and a fifth sensor 50 configured to measure extract air temperature (EAT). As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
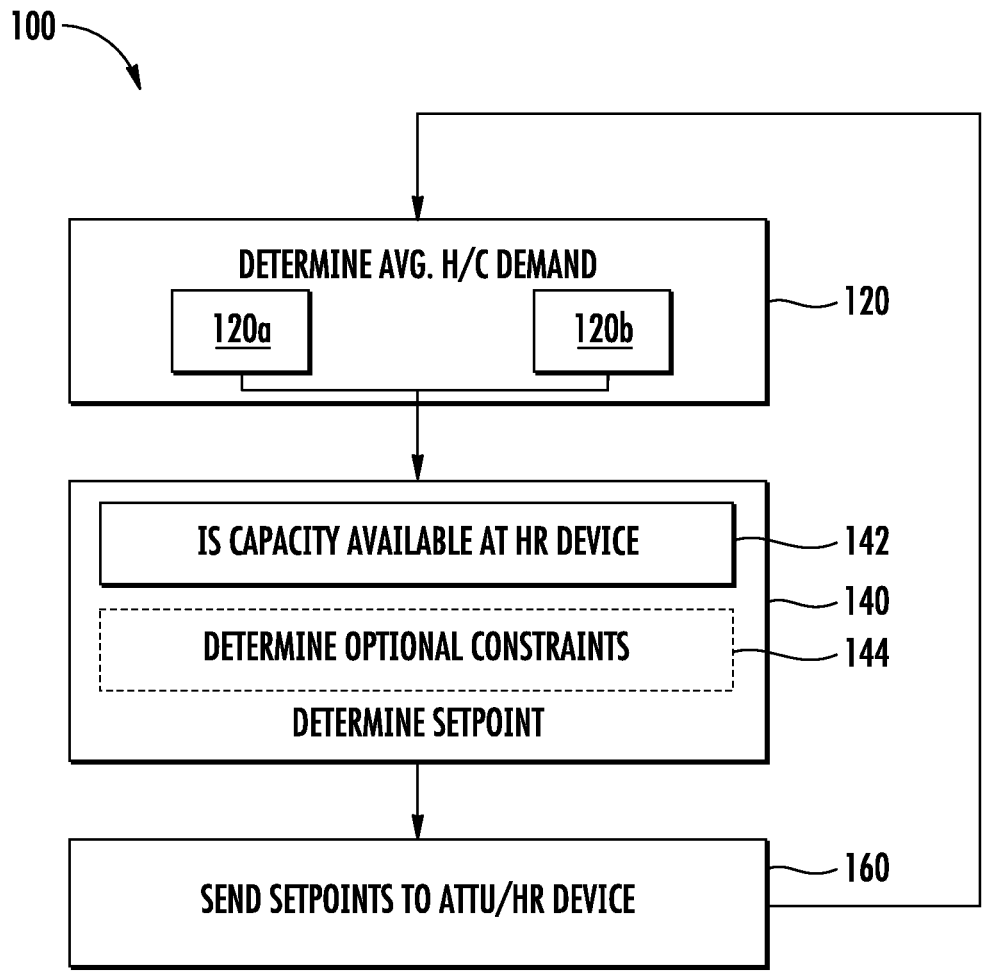
FIG. 2 is a flow chart illustrating an exemplary method of controlling the system shown in FIG. 1.

FIG. 2 illustrates an exemplary method 100 of controlling HVAC system 10 that generally includes steps 120, 140, and 160. At step 120, controller 40 determines the average heating or cooling demand of one or more zones 22 served by HVAC system 10. At step 140, controller 40 determines heat recovery command setpoint(s) based on the determined average demand (Input 1), a capacity available for recovery (Input 2), and may be based on optional constraints on the quality of the air supplied to the zone(s) (for heat recovery devices involving mixing of air), as well as corresponding measurements of air quality of the outside air and air from the zone(s) (Input 3). At step 160, controller 40 sends one or more signals indicative of the determined heat recovery command setpoints to one or more components of HVAC system 10.

At step 120, controller 40 determines the average heating or cooling demand of HVAC system 10 (Input 1). The average demand may be determined by performing step 120a or step 120b, as described herein in more detail.

At step 120a, if HVAC system 10 already includes a decision mechanism (e.g., controller 40) to determine whether a common capacity production system (e.g., plant 12) should be in the heating mode or the cooling mode, then that same decision applies for determining the average demand of HVAC system 10. If system 10 does not include such a decision mechanism or its decision is to turn off a common capacity production system (e.g., plant 12), then step 120b is executed instead.

At step 120b, controller 40 determines the average demand by:

a.

$$\Delta T = \frac{\sum_{OccupiedZones} V_i \Delta T_i}{V_{tot}}, \quad \text{Equation (1)}$$

where $\Delta T_i = RAT_{spi} - RAT_i$ (where $RAT_{spi}$ is the Room Air Temperature Setpoint of the zone/room i and $RAT_i$ is the measured Room Air Temperature of the zone/room i,), $V_i$ is the volume of air in the zone/room, and $V_{tot}$ is the total volume of air for all the occupied zones/rooms 22. If $\Delta T$ is positive, the average demand is determined as heating. If $\Delta T$ is negative, the average demand is determined as cooling.

At step 140, controller determines one or more heat recovery command setpoints based on the determined average demand (Input 1, step 120), the capacity available for recovery at heat recovery device 16 (Input 2, step 142), and optionally constraints and measurements on air quality (Input 3, step 144). The heat recovery command setpoints may be based on the optional constraints only when heat recovery device 16 mixes outside air with extracted air from indoor environment 22.

The average demand (Input 1) is determined in previously recited step 120, indicating whether HVAC system 10 is in cooling or heating demand.

At step 142, controller 40 determines if a heating or cooling capacity is available at heat recovery device 16 (Input 2). The capacity available at heat recovery device 16 is a heating or cooling capacity to heat or cool the air from outside with the air extracted from zone(s) 22. Controller 40 determines if capacity is available by comparing the IAT of the air from outdoor environment 26 (e.g., from sensor 44) with the EAT of the air extracted from indoor environment 22 (e.g., from sensor 50). Cooling capacity is available at heat recovery device 16 if EAT<IAT−DT, where DT is a small temperature gap (e.g., 0.5 or 1° C.) providing a predetermined temperature difference between the two measurements. Heating capacity is available at heat recover device if EAT>IAT+DT.

At optional step 144, controller 40 determines the maximum heat recovery command (Input 3) that does not exceed optional constraints on air quality of the air supplied to the zone(s), such as the humidity ratio, the CO2 content, and/or other air properties (if corresponding constraints and measurements are present).

Based on Input 1 (step 120), Input 2 (step 142), and optionally Input 3 (step 144), controller 40 determines one or more heat recovery command setpoints by the following operation: If capacity demand (Input 1; heating or cooling) is of the same type (heating or cooling) as the available capacity (Input 2; heating or cooling), controller 40 indicates or sets the heat recovery command setpoint to the fully open position of heat recovery device 16 (i.e., 100% open or max open not to exceed Input 3 if constraint(s) are used).

For example, where a constraint and corresponding measurement of CO2 content are present, the CO2 content of the air supplied to zone(s) 22 must be lower than a predetermined setpoint CO2sp. Heat recovery device 16 mixes fresh air from outside 26 with air extracted from zones (22), and the heat recovery command setpoint determines the ratio between the two. The heat recovery command fully open position setpoint that will not exceed the constraint (Input 3) is subsequently determined as:

$$\text{Input 3} = (CO2sp - CO2ia)/(CO2ea - CO2ia), \quad \text{Equation (2)}$$

where CO2ia is the CO2 content of the fresh air from outside and CO2ea is the CO2 content of the air extracted from the building. As such, Input 3 is 100% if CO2ea<=CO2sp. This may assume that the same air flow is taken from the outside environment rather than the inside environment, otherwise Equation (2) may need to account for these air flows.

If capacity demand (Input 1) is not of the same type (heating/cooling) as the available capacity (Input 2), controller 40 indicates the heat recovery command setpoint is 0% such that no thermal capacity is recovered.

At step 160, controller 40 sends the determined heat recovery demand setpoints to AHU 14 (or heat recovery device 16) and operates AHU 14 at the determined setpoints. Step 160 may only be re-executed after a predetermined time (e.g., five minutes) to prevent variations of the heat recovery command between no recovery (0%) and its fully or most open position in heat recovery device 16. Alternatively, a hysteresis mechanism (not shown) may be used such that heat recovery device 16 may only be switched between 0% and 100% if certain predefined thresholds are overcome. Control may then return to step 120. As such, controller 40 is programmed to perform the steps described herein.

Described herein are systems and methods for controlling heat recovery devices in HVAC system components such as an AHU. The systems recover a large portion of otherwise wasted thermal capacity by setting a heat recovery device to a fully open position (100%) when heating or cooling capacity of the HVAC system is available, or to a maximum position (<100%) that does not exceed optional constraints on the quality of air supplied to the building when the heat recovery device mixes outside air and air from the building. If no useful heating or cooling capacity is available for recovery, then heat recovery device is set to a substantially fully closed position (e.g., 0%), which may enable the HVAC system to operate in a free-cooling mode by supplying cold air from outside through the AHU and into the building.

As such, the systems and methods reduce total HVAC system energy consumption, prevent the need for a variable/modulating heat recovery device, prevent the need for a PID control system for heat recovery device control, which saves commissioning time and in-field customization, simplifies implementation with existing controls, and is scalable to a broad range of AHU product and heat recovery device configurations and building types.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

The invention claimed is:
1. A control system for an HVAC system having an air handling unit (AHU) and a heat recovery device, the control system comprising:
   a controller having a processor and a memory, the controller in signal communication with the AHU, the controller configured to:

determine an average heating or cooling demand of one or more zones served by the AHU;

determine if a heating or cooling capacity is available at the heat recovery device, where the capacity available at the heat recovery device is a heating or cooling capacity to heat or cool the air from an outdoor environment with air extracted from the one or more zones served by the AHU, wherein the cooling capacity is available upon a temperature of air extracted from the one or more zones being less than a temperature of the air from the outdoor environment, wherein the heating capacity is available upon a temperature of air extracted from the one or more zones being greater than a temperature of the air from the outdoor environment;

determine a heat recovery command setpoint based on the determined average heating or cooling demand and the determined available heating or cooling capacity, a ratio of air extracted from the one or more zones served by the AHU to air from the outdoor environment mixed at the heat recovery device being a function of the heat recovery command setpoint; and send a signal indicative of the determined heat recovery command setpoint to at least one of the AHU and the heat recovery device;

wherein the controller is further configured to determine constraints, the constraints including values or setpoints on values of humidity or carbon dioxide content of air supplied to the HVAC system, wherein the heat recovery command setpoint is determined to avoid exceeding the constraints.

2. The control system of claim 1, wherein the heat recovery device is configured to allow heat exchange between the air extracted from the indoor environment and air supplied to the indoor environment and not allow heat exchange between the air extracted from the indoor and air supplied to the indoor environment.

3. The control system of claim 2, wherein if the determined average heating or cooling demand is the same as the determined available heating or cooling capacity, the determined heat recovery command setpoint indicates the heat recovery device should allow heat exchange.

4. The control system of claim 3, wherein if the determined average heating or cooling demand is not the same as the determined available heating or cooling capacity, the determined heat recovery command setpoint indicates the heat recovery device should not allow heat exchange.

5. The control system of claim 4, wherein the controller is further configured to allow heat exchange or not allow heat exchange based on the determined heat recovery command setpoint.

6. An HVAC system comprising:
an air handling unit (AHU);
a heat recovery device operably associated with the AHU; and
a controller having a processor and a memory, the controller in signal communication with at least one of the AHU and the heat recovery device, the controller configured to:
determine an average heating or cooling demand of one or more zones served by the AHU;
determine if a heating or cooling capacity is available at the heat recovery device, where the capacity available at the heat recovery device is a heating or cooling capacity to heat or cool the air from an outdoor environment with air extracted from the one or more zones served by the AHU, wherein the cooling capacity is available upon a temperature of air extracted from the one or more zones being less than a temperature of the air from the outdoor environment, wherein the heating capacity is available upon a temperature of air extracted from the one or more zones being greater than a temperature of the air from the outdoor environment;

determine a heat recovery command setpoint based on the determined average heating or cooling demand and the determined available heating or cooling capacity, a ratio of air extracted from the one or more zones served by the AHU to air from the outdoor environment mixed at the heat recovery device being a function of the heat recovery command setpoint; and send a signal indicative of the determined heat recovery command setpoint to at least one of the AHU and the heat recovery device;

wherein the controller is further configured to determine constraints, the constraints including values or setpoints on values of humidity or carbon dioxide content of air supplied to the HVAC system, wherein the heat recovery command setpoint is determined to avoid exceeding the constraints.

7. The HVAC system of claim 6, wherein the heat recovery device is configured to allow heat exchange between the air extracted from the indoor environment and air supplied to the indoor environment and not allow heat exchange between the air extracted from the indoor environment and air supplied to the indoor environment.

8. The HVAC system of claim 7, wherein if the determined average heating or cooling demand is the same as the determined available heating or cooling capacity, the determined heat recovery command setpoint indicates the heat recovery device should allow heat exchange.

9. The HVAC system of claim 8, wherein if the determined average heating or cooling demand is not the same as the determined available heating or cooling capacity, the determined heat recovery command setpoint indicates the heat recovery device should not allow heat exchange.

10. The HVAC system of claim 9, wherein the controller is further configured to allow heat exchange or not allow heat exchange based on the determined heat recovery command setpoint.

11. A method of controlling an HVAC system having an air handling unit (AHU), a heat recovery device, and a controller in signal communication with at least one of the AHU and the heat recovery device, the method comprising:
determining an average heating or cooling demand of one or more zones served by the AHU;
determining if a heating or cooling capacity is available at the heat recovery device, where the capacity available at the heat recovery device is a heating or cooling capacity to heat or cool the air from an outdoor environment with air extracted from the one or more zones served by the AHU, wherein the cooling capacity is available upon a temperature of air extracted from the one or more zones being less than a temperature of the air from the outdoor environment, wherein the heating capacity is available upon a temperature of air extracted from the one or more zones being greater than a temperature of the air from the outdoor environment;
determining a heat recovery command setpoint based on the determined average heating or cooling demand and the determined available heating or cooling capacity, a ratio of air extracted from the one or more zones served by the AHU to air from the outdoor environment mixed at the heat recovery device being a function of the heat recovery command setpoint;

determining constraints, the constraints including values or setpoints on values of humidity or carbon dioxide content of air supplied to the HVAC system, wherein the heat recovery command setpoint is determined to avoid exceeding the constraints;

sending a signal indicative of the determined heat recovery command setpoint to at least one of the AHU and the heat recovery device; and subsequently operating at least one of the AHU and the heat recovery device at the determined heat recovery command setpoint.

12. The method of claim 11, wherein the heat recovery device is configured to allow heat exchange between the air extracted from the indoor environment and air supplied to the indoor environment and not allow heat exchange between the air extracted from the indoor environment and air supplied to the indoor environment.

13. The method of claim 12, wherein if the determined average heating or cooling demand is the same as the determined available heating or cooling capacity, the determined heat recovery command setpoint indicates the heat recovery device should allow heat exchange.

14. The method of claim 13, wherein if the determined average heating or cooling demand is not the same as the determined available heating or cooling capacity, the determined heat recovery command setpoint indicates the heat recovery device should not allow heat exchange.

15. The method of claim 14, wherein said subsequently operating at least one of the AHU and the heat recovery device at the determined heat recovery command setpoint comprises allow heat exchange or not allow heat exchange based on the determined heat recovery command setpoint.

16. The control system of claim 1, wherein the cooling capacity is determined as available upon the temperature of air extracted from the one or more zones being less than the temperature of the air from the outdoor environment minus a temperature gap.

17. The control system of claim 1, wherein the heating capacity is determined as available upon the temperature of air extracted from the one or more zones being greater than the temperature of the air from the outdoor environment plus a temperature gap.

* * * * *